United States Patent
Ragonetti et al.

(10) Patent No.: US 8,240,275 B2
(45) Date of Patent: Aug. 14, 2012

(54) ANIMAL CONDUIT

(75) Inventors: Peter Ragonetti, Brooklyn, NY (US);
Jonathan Willinger, Tenafly, NJ (US);
Klaus Woltmann, Demarest, NJ (US);
Ryan Rutherford, Belleville, NJ (US)

(73) Assignee: J.W. Pet Company, Inc., Teterboro, NJ (US)

( * ) Notice: Subject to any disclaimer, the term of this patent is extended or adjusted under 35 U.S.C. 154(b) by 110 days.

(21) Appl. No.: 12/880,301

(22) Filed: Sep. 13, 2010

(65) Prior Publication Data

US 2011/0061603 A1  Mar. 17, 2011

Related U.S. Application Data

(60) Provisional application No. 61/241,517, filed on Sep. 11, 2009.

(51) Int. Cl.
*A01K 29/00* (2006.01)
(52) U.S. Cl. ........................................................ 119/702
(58) Field of Classification Search .................. 119/702, 119/705, 706, 707, 417
See application file for complete search history.

(56) References Cited

U.S. PATENT DOCUMENTS

| | | | | | |
|---|---|---|---|---|---|
| 4,096,887 | A | * | 6/1978 | Streit | 138/117 |
| 4,699,601 | A | * | 10/1987 | Hershfeld | 446/69 |
| 5,186,122 | A | * | 2/1993 | Phillips et al. | 119/474 |
| 5,664,525 | A | * | 9/1997 | Phillips et al. | 119/452 |
| 5,921,204 | A | * | 7/1999 | Johnson | 119/452 |
| 6,253,712 | B1 | * | 7/2001 | Johnson | 119/707 |
| 7,363,879 | B2 | * | 4/2008 | Bonner et al. | 119/417 |
| D597,264 | S | * | 7/2009 | Hsieh | D30/160 |
| 8,074,608 | B1 | * | 12/2011 | Smith | 119/706 |

* cited by examiner

*Primary Examiner* — Yvonne Abbott
(74) *Attorney, Agent, or Firm* — Katten Muchin Rosenman LLP

(57) ABSTRACT

An animal conduit includes a first and a second longitudinal segment. Each segment includes ridges extending inward toward a longitudinal centerline of the animal conduit. The ridges differ in a dimension extending inward and forming a first and second transverse conduit opening dimension that differ.

19 Claims, 8 Drawing Sheets

ANIMAL CONDUIT

CROSS-REFERENCE TO RELATED APPLICATIONS

This application claims priority to and is a non-provisional counterpart to U.S. Ser. No. 61/241,517 filed Sep. 11, 2009, which is pending and which is hereby incorporated by reference in its entirety for all purposes.

BACKGROUND OF THE INVENTION

"Small animals," such as hamsters, gerbils, and mice are often kept as pets in cages that are connected by one or more passageways to entertainment and/or interactivity features located external to the cage.

The passageways are comprised of one or more conduits that can be assembled together by various means to interchangeably form the passageways. Some conduits may be arranged to be vertically or angled steeply upwards or downwards with respect to a horizontal plane. The small animals traverse vertically or steeply angled conduits by wedging their backs against one area of the conduit and simultaneously use their feet for propulsion.

To make such a climbing technique possible, conduits must be suitably sized. A conduit that is too large will not allow the animal to press their back against one side and have the feet reach the opposed side.

Conduits known in the art use a nominal diameter of two inches, i.e. "standard conduits." The diameter is considered to be nominal because most conduits include features that reduce the diameter in some aspect over some portion of the conduit. For example, the conduit may include raised ridges on the inside for the animal to grasp with their feet or includes end portions that are configured as overlapping/underlapping sleeves.

The two inch diameter is suitable for a Syrian hamster, also known as a Golden Hamster, i.e., *Mesocricetus auratus*, and certain gerbils, it is too large for dwarf hamsters, i.e., *Phodopus campbelli*—Campbell's Dwarf Hamster, *Phodopus roborovskii*—Roborovski's (Desert) Dwarf Hamster, or *Phodopus sungorus*—Winter White Russian (Dzhungarian) Dwarf Hamster, individually and collectively "dwarf hamsters." Similarly, a two inch diameter is unsuitable for baby Syrian hamsters or baby dwarf hamsters, i.e., "baby hamsters."

Although, conduits known in the art may be scaled down to accommodate dwarf hamsters or baby hamsters, pet owners may have already made an investment in cages and standard conduits and, thus, wish to keep these standard conduits and yet have them be usable with dwarf hamsters or baby hamsters. Similarly, pet owners may wish to be able to interchangeably use a standard conduit for a Syrian hamster and dwarf hamsters or baby hamsters. Thus, what is needed is a means to permit dwarf hamsters or baby hamsters to utilize a standard conduit.

SUMMARY OF THE INVENTION

These and other needs are met by the present invention.

An animal conduit includes a first and a second longitudinal segment. Each segment includes ridges extending inward toward a longitudinal centerline of the animal conduit. The ridges differ in a dimension extending inward and forming a first and second transverse conduit opening dimension that differ.

An animal conduit includes a tubular unit having a first and a second end opening, a plurality of first ridges, and a plurality of second ridges. The plurality of first and second ridges extending inwardly toward a longitudinal center line of the tubular unit and forming a reduced conduit dimension in a first direction and a regular conduit dimension in a second direction. The plurality of first and second ridges are regularly spaced to provide easy climbing for both a dwarf hamster and a regular hamster.

Other embodiments are also taught herein.

BRIEF DESCRIPTION OF THE DRAWINGS

FIG. 5b is a perspective view of a first longitudinal segment of the animal conduit of FIG. 5a.

FIG. 5c is a perspective view of a second longitudinal segment of the animal conduit of FIG. 5a.

FIG. 6b is a planar cross-sectional view of the animal conduit of FIG. 5a.

DETAILED DESCRIPTION OF THE INVENTION

FIGS. 1a-1f are a perspective view, a front view, a right-side view, a left-side view, a top view, and a bottom view of an adapter unit for smaller animals in accordance with one or more embodiments of the present invention. FIGS. 2a-2e are a perspective view, an exploded view, a front view, a left-side view, and a top view of the adapter unit for smaller animals of FIGS. 1a-1f in combination with an animal conduit in accordance with one or more embodiments of the present invention.

Figure 1A:
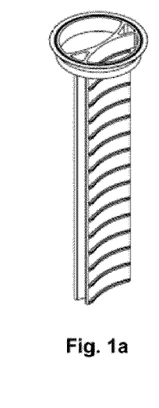
FIGS. 1a-1f are a perspective view, a front view, a right-side view, a left-side view, a top view, and a bottom view of an adapter unit for smaller animals in accordance with one or more embodiments of the present invention.
Figure 1B:
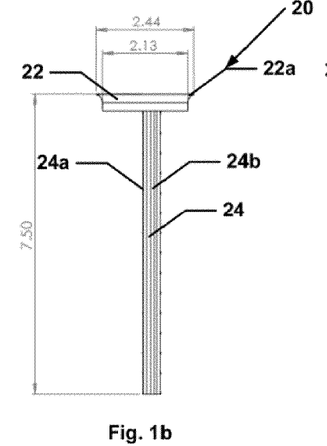
Figure 1C:
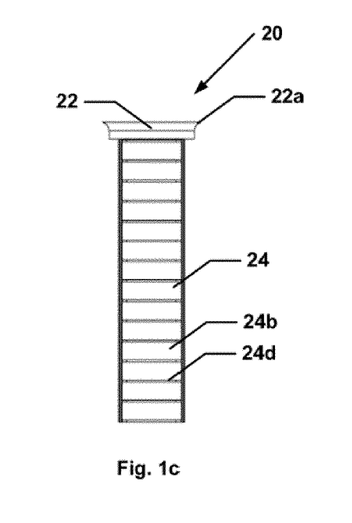
Figure 1D:
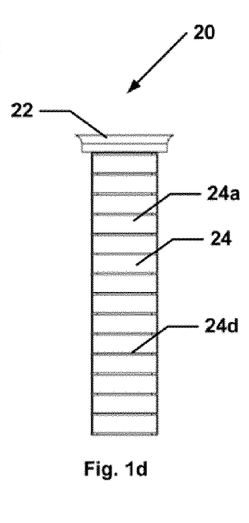
Figure 1E:
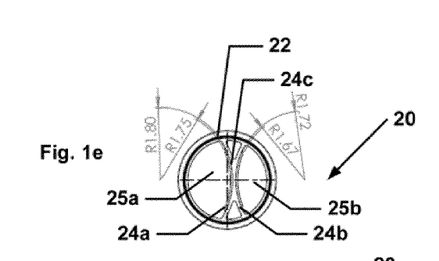
Figure 1F:
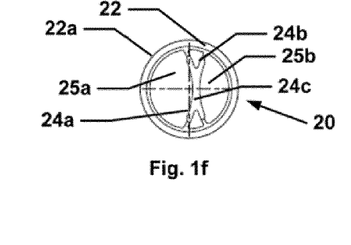
Figures 2A, 2C, 2D, 2E:
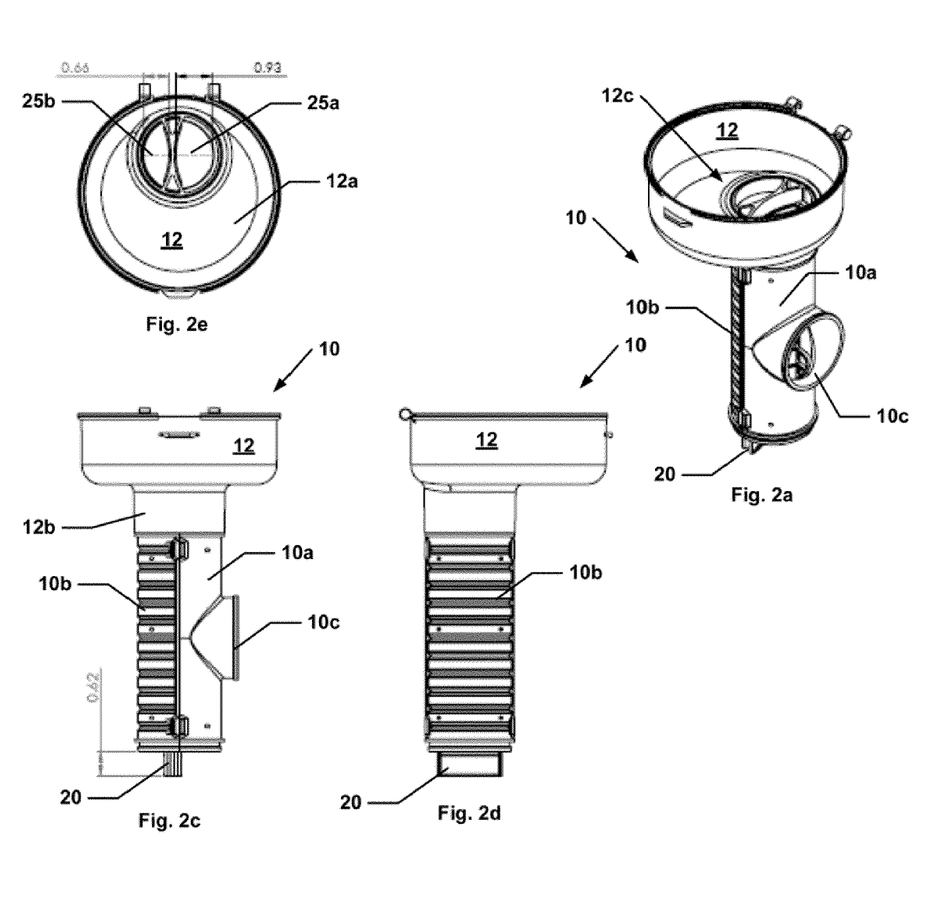
FIGS. 2a-2e are a perspective view, an exploded view, a front view, a left-side view, and a top view of the adapter unit for smaller animals of FIGS. 1a-1f in combination with an animal conduit in accordance with one or more embodiments of the present invention.
Figure 2B:
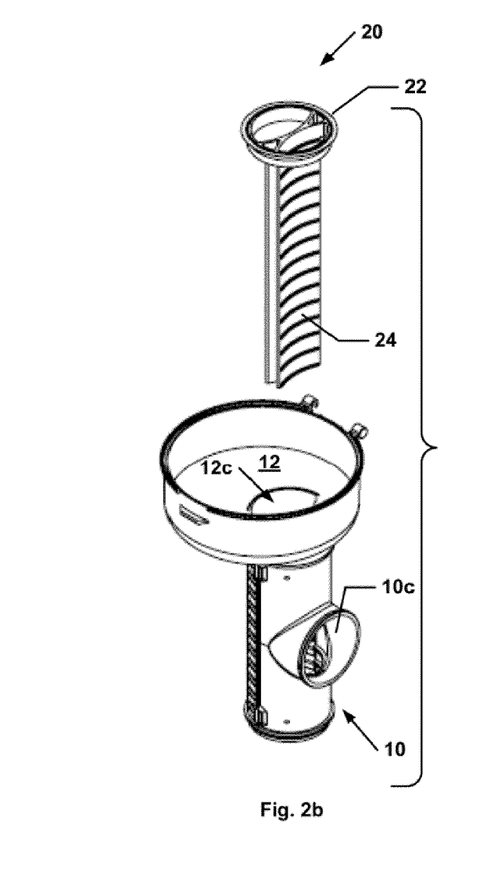

An animal conduit 10 of the prior art is part of a passageway system and/or entertainment system for small animals, such as hamsters or the like. Animal conduit 10 is a standard conduit and is typically made of molded translucent plastic and comprises a tubular segment that is configured to be suitable for small animals such as Syrian hamsters to climb upwards, including climbing vertically.

To be suitable for the Syrian hamster, animal conduit 10 may comprise circular cross-section having, for example, a nominal diameter of two inches that permits a Syrian hamster to climb or descend, yet is too large for dwarf hamsters or baby hamsters, i.e., "reduced size animals."

Animal conduit 10 may be configured in any suitable way. For example, animal conduit 10 may be configured to comprise two longitudinal segments 10a, 10b, that may be joined together to form a tubular unit, as illustrated in FIGS. 2a-2e, or may comprise a single tubular member rather than two longitudinal segments. Animal conduit 10 may even a greater number of longitudinal segments than two.

Animal conduit 10 may comprise an opening 10c for adjoining an oriented animal conduit or any other connectable item perpendicularly to the animal conduit. Animal conduit 10 includes two end portions 10d, 10e. As illustrated in FIGS. 2a-2e, a resting area 12 is connected to one end portion for an animal's enjoyment and includes a floor 12a and a sleeve 12b for receiving the animal conduit. Sleeve 12b is slightly wider than the animal conduit and forms an entrance 12c, which is preferably configured to permit easy entrance and exit for the resident small animal. Thus, it may have rounded edges.

An adapter unit 20 of the present invention comprises a head 22 and a shaft 24. Head 22 includes a flange 22a. The flange is preferably configured as an annular flange and has a curved outer cross-sectional shape that substantially matches the rounded edges of entrance 12b so that flange 22a, i.e., head 22 is received without play in entrance 12c.

Shaft 24 comprises two longitudinally extending members 24a and 24b that are preferably joined to each other along an extending portion 24c. Each extending member is connected at one to inner surface 22b of head 22 and includes a plurality of ridges 24d that may be raised or indented. Extending members 24a and 24b serve to restrict the size of the opening of conduit to permit its use by animals smaller than Syrian hamsters, e.g., the reduced size animals.

Extending members 24a, 24b comprises a cross-sectional shape of a curve or ellipse to avoid injuring the smaller animal. Therein, extending member 24a may have a cross-sectional shape comprising a curve or ellipse having a radius of 1.75 inches and comprises a larger reduced opening 25a (relative to the opening of a standard conduit) in conduit 10 than extending member 24b, which may have a cross-sectional shape comprising a curve having a radius of 1.67 inches and comprises a smaller reduced opening 25b than extending member 24a.

The extending members have a distal end that may be longer than the animal conduit in which it is used.

In use, adapter unit 20 can be advantageously used in a conduit that was designed to serve Syrian hamsters to permit dwarf hamsters and baby dwarf hamsters to climb vertically upwards by reducing the opening. This allows the smaller animals to push their backs against one sidewall of the opening and feet against an opposed sidewall of the opening. Thus, one portion or all portions of the passageway system and/or entertain system may be made accessible to the smaller animals quickly, cost-effectively, and without needing to replace all conduits.

It should be appreciated that conduit 10 may have a longitudinally extending curve. Thus, adapter unit 20 may also have such a curve so that it is received in the conduit. Adapter unit 20 may be made preferably of molded plastic to keep its shape as the smaller animal climbs.

Figures 3A, 3B, 3C, 3D, 3E:
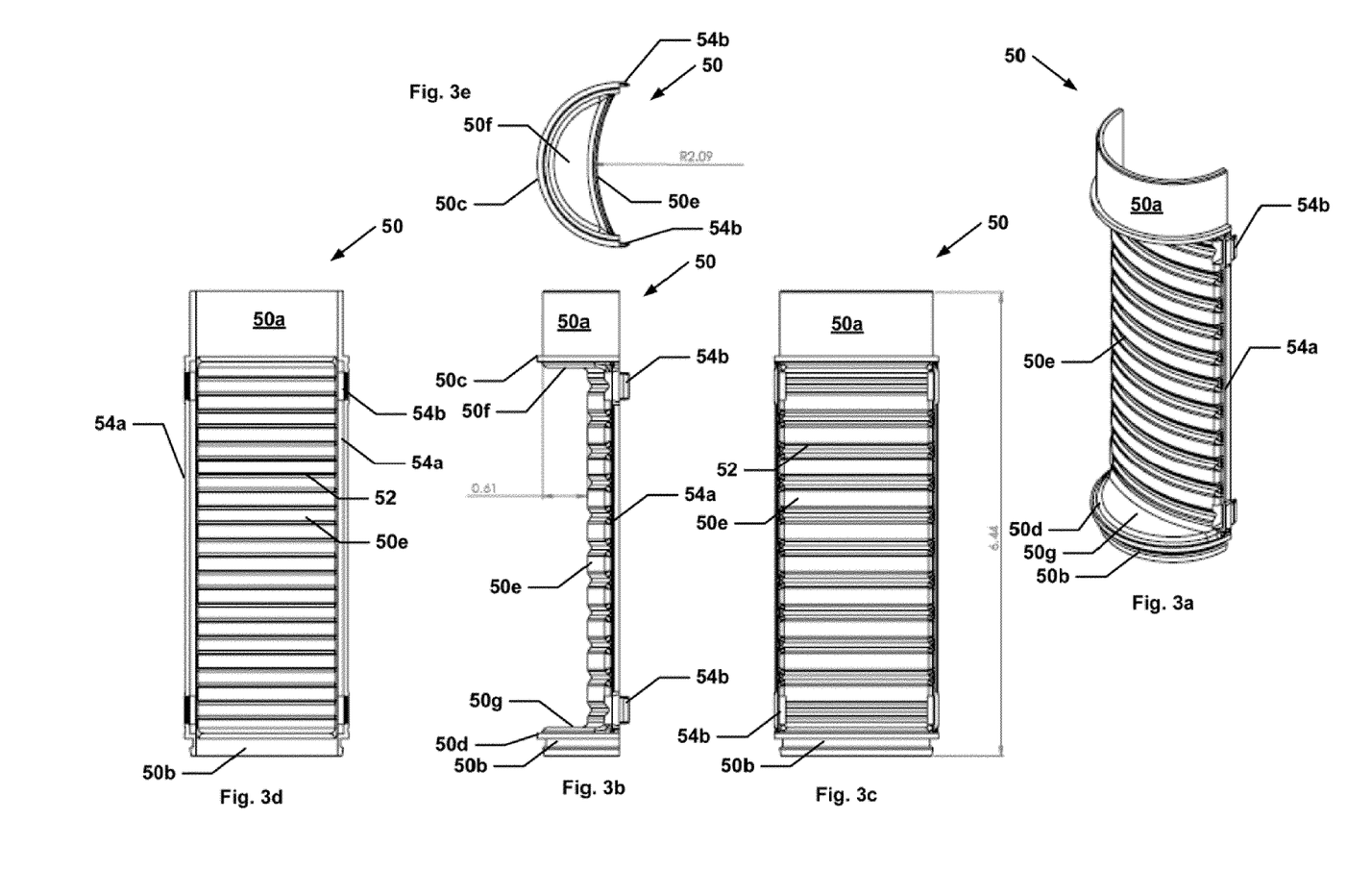
FIGS. 3a-3e are a perspective view, a front view, a right-side view, a left-side view, and a top view of an adapter unit for smaller animals in accordance with one or more embodiments of the present invention.
Figure 4A:
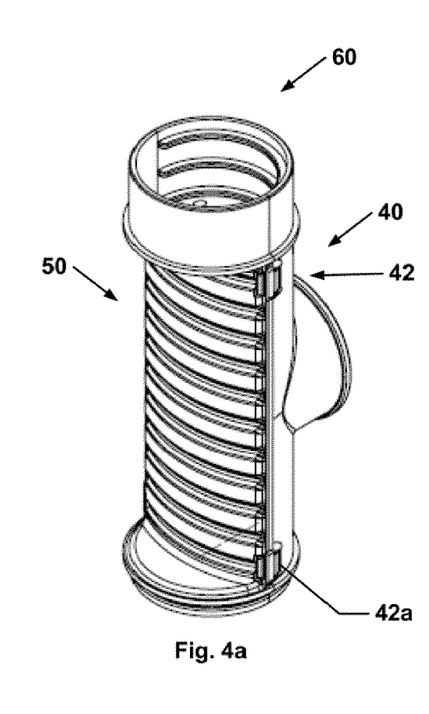
FIGS. 4a-4c are a perspective view, a front view and a top view of the adapter unit for smaller animals of FIGS. 3a-3e in combination with a longitudinal segment of an animal conduit in accordance with one or more embodiments of the present invention.
Figure 4B:
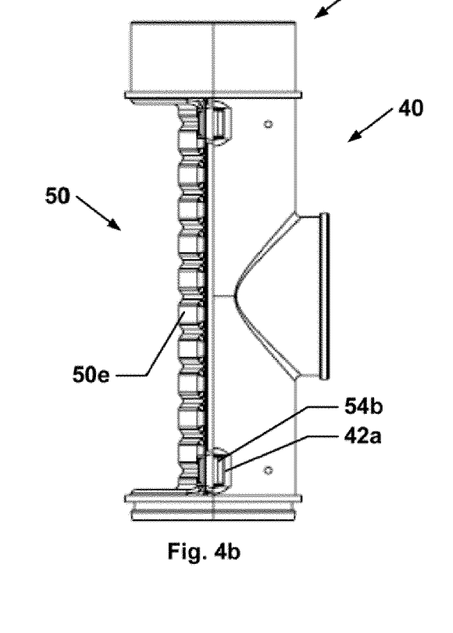
Figure 4C:
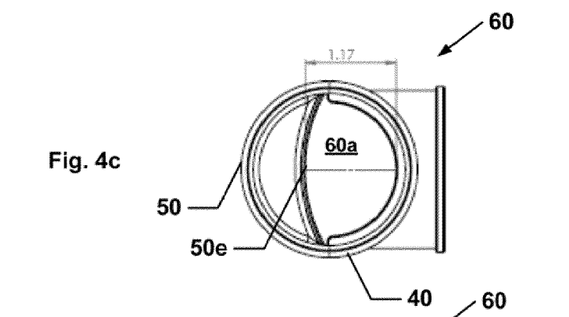

FIGS. 3a-3e are a perspective view, a front view, a right-side view, a left-side view, and a top view of an adapter unit for smaller animals in accordance with one or more embodiments of the present invention. FIGS. 4a-4c are a perspective view, a front view and a top view of the adapter unit for smaller animals of FIGS. 3a-3e in combination with a longitudinal segment of an animal conduit in accordance with one or more embodiments of the present invention.

An animal conduit 40 of the prior art is part of a passageway system and/or entertainment system for small animals, such as hamsters or the like. Animal conduit 40 includes a first longitudinal segment 40a and a second longitudinal segment (not shown) that has been removed. The longitudinal segments comprise a snap-fit system 42 that comprises tabs disposed on a first segment and slots 42a disposed on a second segment to lockingly receive the first segment. Together, the longitudinal segments may form a standard conduit with a nominal two inch diameter.

An adapter unit 50 comprises a first and second sleeve portions 50a, 50b including respective edge portions 50c, 50d for securing like combinations. Adapter unit 50 includes a body 50e disposed between sleeve portions 50a, 50b and which comprise respective transition portions 50f, 50g.

Body 50e comprises a cross-sectional shape of a curve having diameter that is recessed from the center of the standard conduit. Therein, body 50e may have an approximate 2 inch diameter, but that is recessed by an approximate 0.61 inches.

A plurality of raised ridges 52 is disposed on the body. Adapter unit 50 comprises longitudinal edges 54a that comprise a plurality of forwardly extending tabs 54b for interlocking with slots 42a to form a modified animal conduit 60. Therein, the modified animal conduit comprises an opening 60a having a size reduced from that of a standard conduit. For example, the opening may comprise a maximum dimension of 1.17 inches.

In use, adapter unit 50 can be advantageously used with a longitudinal segment in a standard conduit that was designed to serve Syrian hamsters to permit dwarf hamsters and baby dwarf hamsters to climb vertically upwards by reducing the opening. This allows the smaller animals to push their backs against one sidewall of the opening and feet against an opposed sidewall of the opening. Thus, one portion or all portions of the passageway system and/or entertain system may be made accessible to the smaller animals quickly, cost-effectively, and without need to replace all conduits.

Figures 5A, 6A:
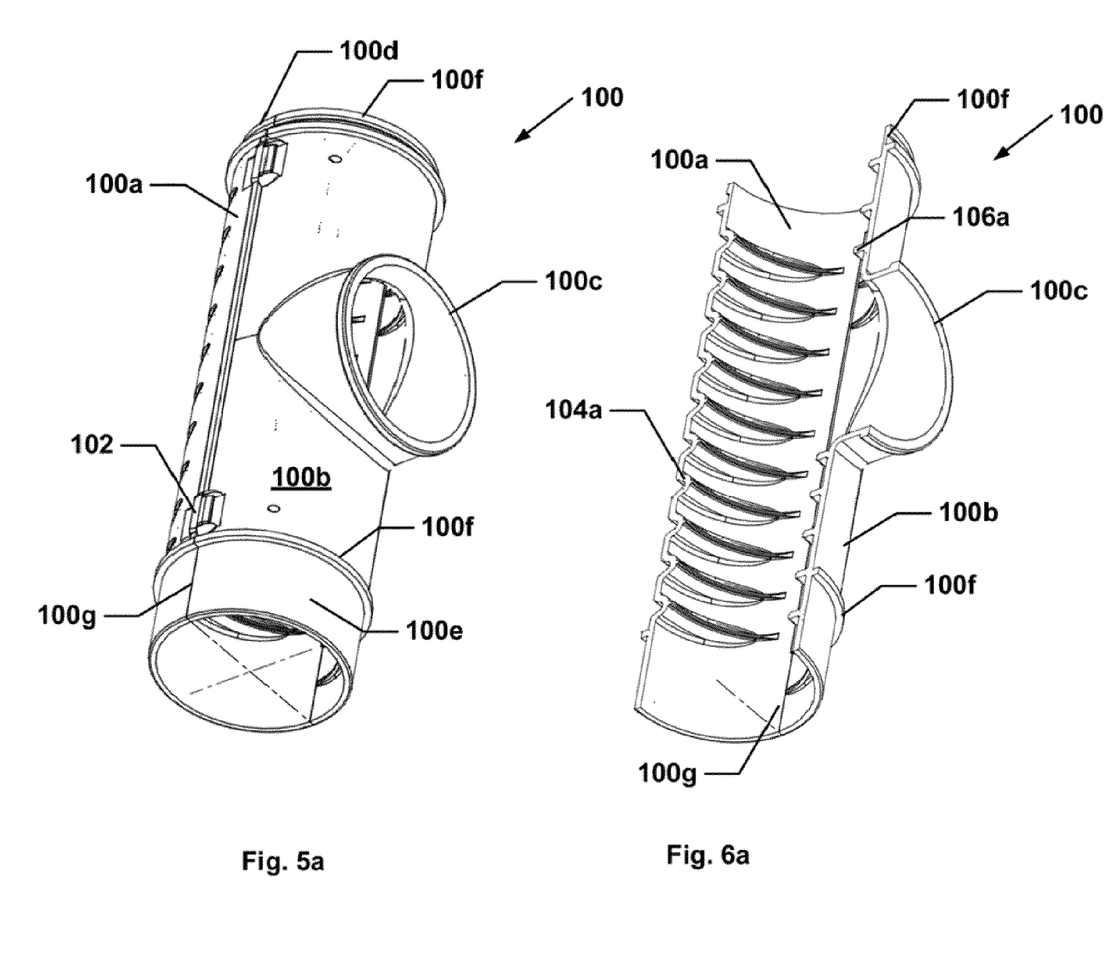
FIG. 5a is a perspective view of an animal conduit in accordance with one or more embodiments of the present invention.
FIG. 6a is a perspective cross-sectional view of the animal conduit of FIG. 5a in accordance with one or more embodiments of the present invention.
Figure 5B:
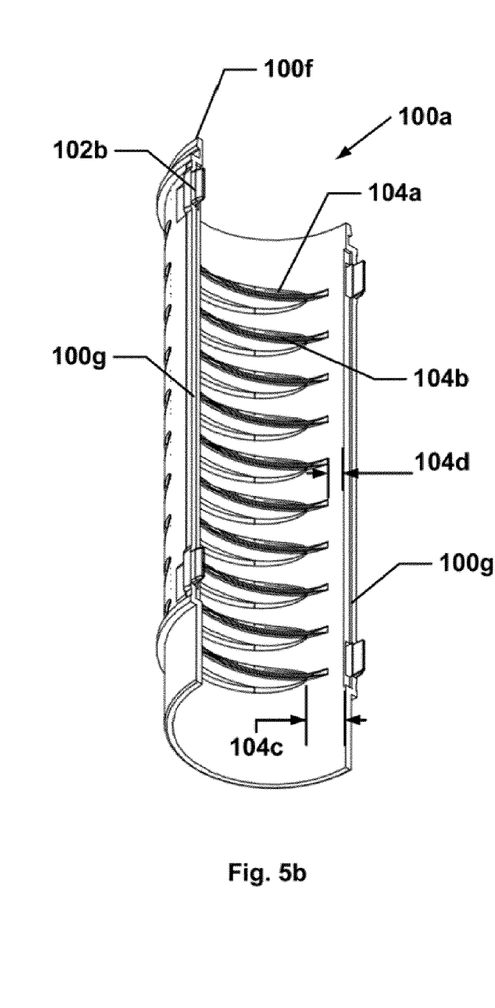
Figure 5C:
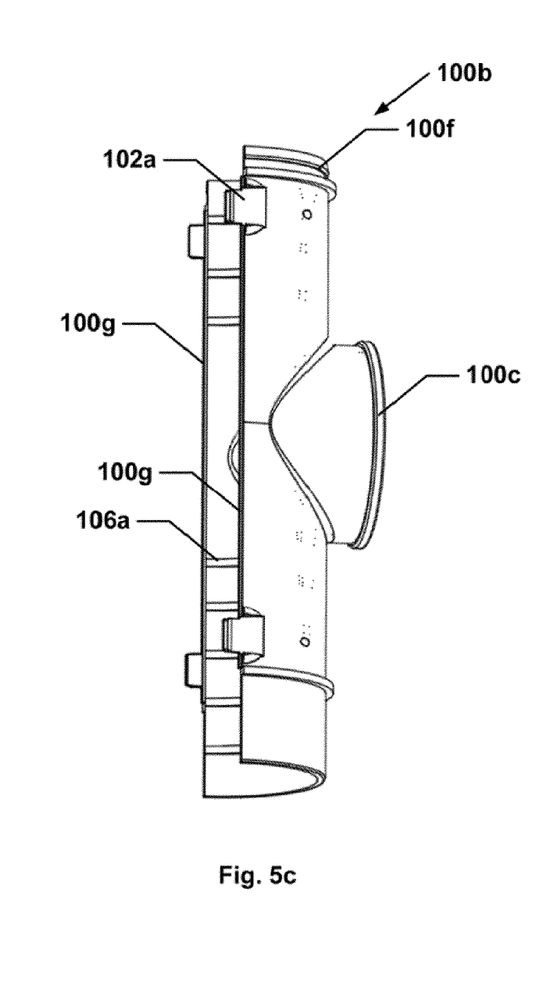

FIG. 5a is a perspective view of an animal conduit in accordance with one or more embodiments of the present invention. FIG. 5b is a perspective view of a first longitudinal segment of the animal conduit of FIG. 5a. FIG. 5c is a perspective view of a second longitudinal segment of the animal conduit of FIG. 5a. An animal conduit 100 is part of a passageway system and/or entertainment system for small animals, such as hamsters or the like. Animal conduit 100 is typically made of molded translucent plastic and comprises a tubular segment that is configured to be suitable for small animals, such as Syrian hamsters, and for even reduced size animals, such a dwarf hamsters or baby hamsters, to climb upwards, including climbing vertically. Therein, animal conduit 100 may comprise generally circular cross-section having, for example, a nominal outer diameter of two inches.

The conduit may be configured in any suitable way and may comprise one or more longitudinal segments. In particular, conduit 100 preferably comprises two longitudinal segments 100a, 100b that may be joined together to form a tubular unit, as illustrated in FIG. 5a, or may comprise a single tubular member rather than two longitudinal segments.

Animal conduit 100 may comprise an opening 100c for adjoining an oriented animal conduit or any other connectable item perpendicularly to the animal conduit. Animal conduit 100 includes two end portions 100d, 100e, that may comprise one or more features that other animal conduits to be joined by overlapping/underlapping, snap fit, or any other suitable means. One or more end portions may comprise a ridge 100f that aids in locking animal conduit 100 to a like animal conduit 100 and/or another feature, such as resting area 12.

The longitudinal segments comprise a snap-fit system 102 that comprises tabs 102a disposed on a first segment and slots 102b disposed on a second segment to lockingly receive the tabs. Together, the longitudinal segments comprise one or more forwardly extending tabs 102a and/or slots 102b that receive tabs 102b for interlocking with at least one other segment and form a conduit with a nominal two inch outer diameter. Each longitudinal segment 100a, 100b, may have one or more longitudinal edges 100g that adjoin a respective edge 100g of another longitudinal segment to form closed animal conduit 100.

Figure 6B:
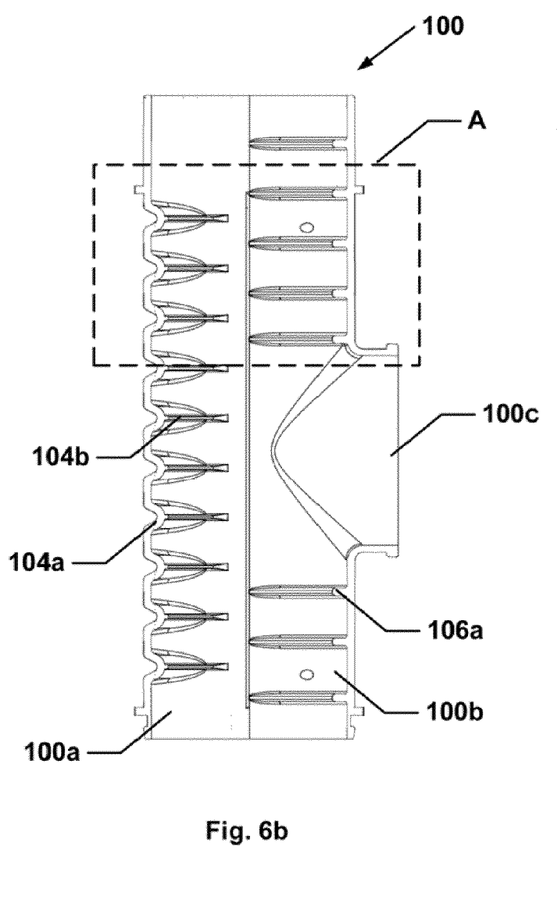
Figure 6C:
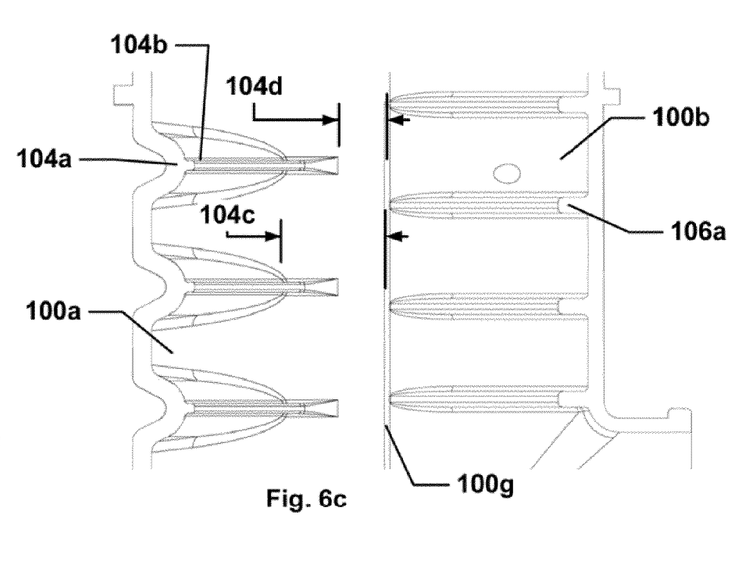
FIG. 6c is a detail cross-sectional view of a first and second ridge type in accordance with one embodiment of the present invention.

FIG. 6a is a perspective cross-sectional view of the animal conduit of FIG. 5a in accordance with one or more embodiments of the present invention. FIG. 6b is a planar cross-sectional view of the animal conduit of FIG. 5a. FIG. 6c is a detail cross-sectional view of a first and second ridge type in accordance with one embodiment of the present invention of detail A in FIG. 6b.

A first longitudinal segment, here illustrated as longitudinal segment 100a, comprises one or more ridges 104a of a first ridge type. Each ridge 104a extends inwardly towards a central longitudinal axis of the animal conduit. Ridges 104a may be deeply indented forming a corrugated pattern on an outside surface of the longitudinal segment. The inwardly extending ridges may be regularly spaced to provide easy climbing for a dwarf hamster while traversing the interior of the animal conduit; e.g., the dwarf hamster will pull himself up using the ridges inside the animal conduit.

Each ridge or selected ridges 104a may be U-shaped in cross-section to provide rigidity to the longitudinal and easy forming of the tube. One or more ridges may comprise a protruding rung 104b at respective apexes of the ridges. Rung 104b is preferably a thin member that provides a gripping edge for the small animal to ease climbing while also extending the ridge further into the tube.

Each ridge preferably ends a predetermined distance 104c from edge or edges 100g of the longitudinal segment and is preferably configured to be tapered toward an inner surface of the segment at the ridge's ends for the safety of the animal. Preferably, rung 104b extends beyond the other portions of the ridge to make climbing easy. Rung 104b ends a predetermined distance 104d from edge or edges 100g of the longitudinal segment and is preferably configured to be tapered toward an inner surface of the segment at the rung's ends for the safety of the animal.

Each segment may have ridges 104a, e.g., rungs 104b, spaced apart at a distance of 0.46 inches center to center. Thus, each segment may have a ten (10) ridges 104a and accompanying rungs 104b.

A second longitudinal segment, here illustrated as longitudinal segment 100b, comprises one or more ridges 106a of a second ridge type. Each ridge 106a extends inwardly towards a central longitudinal axis of the animal conduit. Ridges 104a may be flange extending from one edge 100g to another edge 100g of segment 100b and may be tapered at its ends for safety of the animal. Ridges 106a may be regularly spaced to provide surface from which the reduced size animals push their backs while climbing ridges 104a with their feet. Each segment may have ridges 106a, spaced apart at a distance of 0.42 inches center to center.

Figure 7A:
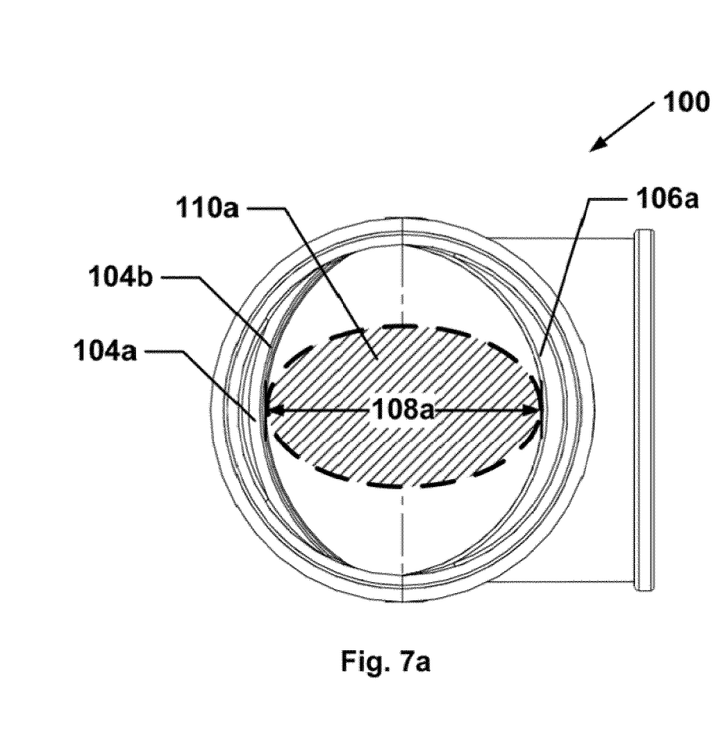
FIG. 7a is an end view of the animal conduit of FIG. 5a wherein a reduced size animal is schematically shown to use the animal conduit.
Figure 7B:
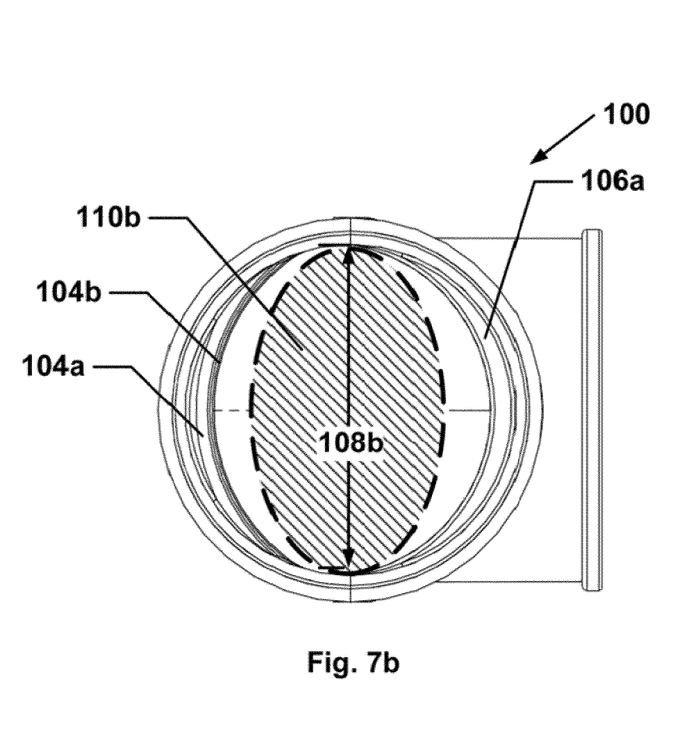
FIG. 7b is an end view of the animal conduit of FIG. 5a wherein a small animal is schematically shown to use the animal conduit.

FIG. 7a is an end view of the animal conduit of FIG. 5a wherein a reduced size animal is schematically shown to use the animal conduit. FIG. 7b is an end view of the animal conduit of FIG. 5a wherein a small animal is schematically shown to use the animal conduit. In use, animal conduit 100 can be by Syrian hamsters and dwarf hamsters and baby hamsters to climb vertically due to the reduced opening of animal conduit. Therein, ridges 104a and ridges 106a are disposed opposite each other to form reduced conduit dimensions 108a, while maintaining a substantially regular conduit dimension 108b. Conduit dimension 108a allows reduced size animals (as represented by a schematic torso cross-section 110a at the ribs) to push their backs against ridges 106a of the opening and climb along ridges 104a and rungs 104b. Conduit dimension 108b allows small animals (as represented by a schematic torso cross-section 110b at the ribs) to use the other portions of the inner surface of animal conduit 100 to traverse the conduit.

Conduit dimension 108a preferably may be 1.65 inches and conduit dimension 108b preferably may be 1.97 inches. Rung 104b preferably has a radius of 1.11 inches at an outer edge of rung 104b closest to a longitudinal centerline of the animal conduit. Ridge 106a preferably has a radius of 1.00 inches at an outer edge of the ridge 106a closest to a longitudinal centerline of the animal conduit. These dimensions permitting both dwarf and regular hamsters to use the animal conduit efficiently, while also permitting efficient molding and aesthetic appeal.

Thus, the same passageway system and/or entertain system may be made accessible to reduced size animals and regular small animals.

The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples, therefore, do not limit the invention to the specific embodiments described, and the invention includes modifications to these embodiments that do not depart from the spirit and scope of the invention.

What is claimed is:

1. An animal conduit comprising:
   a tubular unit comprising a first and a second end opening, a plurality of first ridges, and a plurality of second ridges;
   the plurality of first and second ridges extending inwardly toward a longitudinal center line of the tubular unit and forming a reduced conduit dimension in a first direction and a regular conduit dimension in a second direction;
   the plurality of first and second ridges being regularly spaced to provide easy climbing for both a dwarf hamster and a regular hamster;
   wherein at least one of the plurality of first or second ridges comprises a U-shape in cross-section.

2. The animal conduit of claim 1, wherein at least one of the plurality of first or second ridges form corrugations in the tubular unit.

3. The animal conduit of claim 1, wherein at least one of the plurality of first and second ridges comprises a gripping edge.

4. The animal conduit of claim 1, wherein the reduced conduit dimension comprises 1.65 inches.

5. The animal conduit of claim 4, wherein the regular conduit dimension comprises 1.97 inches.

6. The animal conduit of claim 1, wherein the regular conduit dimension comprises 1.97 inches.

7. An animal conduit comprising:
a tubular unit comprising a first and a second end opening, a plurality of first ridges, and a plurality of second ridges;
the plurality of first and second ridges extending inwardly toward a longitudinal center line of the tubular unit and forming a reduced conduit dimension in a first direction and a regular conduit dimension in a second direction;
the plurality of first and second ridges being regularly spaced to provide easy climbing for both a dwarf hamster and a regular hamster;
wherein the plurality of first ridges comprises a rung.

8. The animal conduit of claim 7, wherein at least one of the plurality of first and second ridges comprises a gripping edge.

9. The animal conduit of claim 7, wherein at least one of the plurality of first or second ridges form corrugations in the tubular unit.

10. The animal conduit of claim 7, wherein the reduced conduit dimension comprises 1.65 inches.

11. The animal conduit of claim 10, wherein the regular conduit dimension comprises 1.97 inches.

12. The animal conduit of claim 7, wherein the regular conduit dimension comprises 1.97 inches.

13. An animal conduit comprising:
a first and a second longitudinal segment, each segment comprising a plurality of ridges extending inward toward a longitudinal centerline of the animal conduit; the ridges differing in a dimension extending inward and forming a first and second transverse conduit opening dimension that differ.

14. The animal conduit of claim 13, wherein the plurality of ridges are spaced apart to provide a climbing aid to a small animal.

15. The animal conduit of claim 13, wherein the plurality of ridges comprises a first type of ridge and a second type of ridge.

16. The animal conduit of claim 15, wherein the first type of ridge comprises a radius that is different than a radius of the second type of ridge.

17. The animal conduit of claim 13, wherein the first transverse conduit opening dimension comprises 1.65 inches and the second transverse conduit opening dimension comprises 1.97 inches.

18. The animal conduit of claim 13, wherein the animal conduit comprises a generally tubular dimension.

19. The animal conduit of claim 13, further comprising end portions for joining to a like animal conduit.

* * * * *